United States Patent [19]

Zivkovic

[11] Patent Number: 4,861,119

[45] Date of Patent: Aug. 29, 1989

[54] PRESSURE MODULATOR FOR AN ANTI-LOCK VEHICLE WHEEL BRAKING SYSTEM

[75] Inventor: Milorad Zivkovic, Filderstadt, Fed. Rep. of Germany

[73] Assignee: Daimler-Benz Aktiengesellschaft, Stuttgart, Fed. Rep. of Germany

[21] Appl. No.: 286,084

[22] Filed: Dec. 19, 1988

[30] Foreign Application Priority Data

Dec. 19, 1987 [DE] Fed. Rep. of Germany ....... 3743187

[51] Int. Cl.$^4$ .............................................. B60T 8/42
[52] U.S. Cl. ..................................... 303/115; 303/116
[58] Field of Search .................... 188/181 A; 303/113, 303/115, 116, 117, 119

[56] References Cited

U.S. PATENT DOCUMENTS

| | | | |
|---|---|---|---|
| 4,690,464 | 9/1987 | Matsuda et al. | 303/115 |
| 4,753,491 | 6/1988 | Wupper | 303/115 |

FOREIGN PATENT DOCUMENTS 3602430  7/1987  Fed. Rep. of Germany .

Primary Examiner—Duane A. Reger
Attorney, Agent, or Firm—Barnes & Thornburg

[57] ABSTRACT

In a pressure modulator for an anti-lock vehicle wheel braking system, responsive to a change of volume of a modulation chamber, caused by a flange of a first central piston element cooperating with a piston step of a second piston element. The piston elements are located in a bore step of the pressure modulator housing which has a diameter which is larger than that of the modulation chamber. The two piston elements each have a displaceable piston flange for forming two sides of a control-pressure space, subject to outlet pressure of an auxiliary-pressure source, which causes the piston elements to be forces, counter to a pre-stress of a modulator spring engaging thereon, into a position which corresponds to a minimum volume of the modulation chamber and when subject to a valve-controlled relief of pressure in the control-pressure space, the piston elements assume the position corresponding to a maximum volume of the modulation chamber.

9 Claims, 1 Drawing Sheet

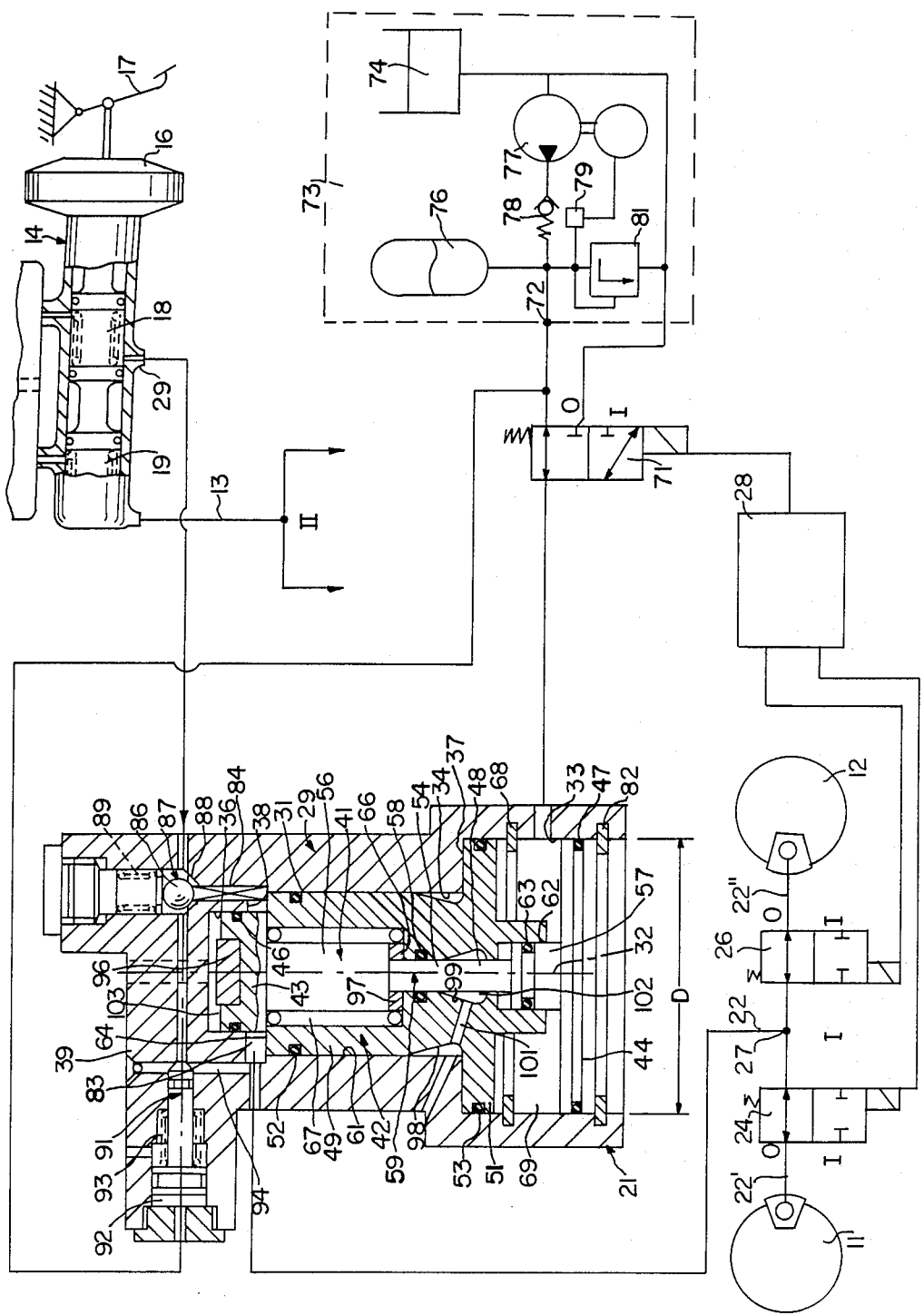

PRESSURE MODULATOR FOR AN ANTI-LOCK VEHICLE WHEEL BRAKING SYSTEM

BACKGROUND AND SUMMARY OF THE INVENTION

The invention relates to a pressure modulator for a vehicle hydraulic brake system having wheel brakes which are connected via a brake circuit to a brake operator through the pressure modulator and wherein an anti-locking braking control modifies the operation of the brake operation by causing the pressure modulator to reduce the brake pressure applied to the wheel brakes in response to an anti-locking signal from the anti-locking brake control. The pressure modulator comprises: a housing; a moveable modulator piston; a control pressure space; and an annular modulation chamber; an auxiliary pressure source; a sump; and a control valve for alternatively connecting the auxiliary pressure source and the sump to the control pressure space. Connection of auxiliary pressure to the control pressure space by the control valve, causes the modulator piston to reduce the size of annular modulation chamber to a minimum volume, while connection to the sump enlarges the size of annular modulation chamber to a maximum volume.

A pressure modulator of this general type appears in applicant's German Patent Application p. 36 37 781.3-21 as an element in an anti-lock wheel braking system. This pressure modulator has a modulation chamber as a portion of the main brake line of the brake circuit subjectable to the anti-lock control and is delimited by one side of a smaller piston step of a modulator step piston. The larger piston step delimits one side of a control-pressure space of an auxiliary-pressure source to cause the modulator step piston to be forced, counter to the effect of a powerful restoring spring, into a basic position corresponding to a minimum volume of the modulation chamber. In order to control the pressure reduction phases of this anti-lock control, the control-pressure space is connected to a pressureless tank of the auxiliary-pressure source as a result of the changeover of an ABS control valve. The modulator spring displaces the modulator piston with the effect of an increase in volume of the modulation chamber to obtain the desired reduction of brake pressure. A disadvantage of this construction is that the modulator piston, because of its relatively large mass, influences the response behavior of the control to a considerable extent. If a modulator spring with a high restoring force is chosen, so that a higher acceleration of the modulator piston can be achieved, then either an auxiliary-pressure source working at a very high pressure level has to be used, or a very large cross-sectional area has to be chosen for the control-pressure space, and this in turn necessarily entails an increase in the mass of the modulator piston.

The best possible compromise between the spring force and the piston mass must also involve restrictions as regards the response behavior of the control.

The object of the invention is therefore, to improve a pressure modulator of the general type mentioned in the introduction, to effect a faster response behavior of the anti-lock control.

According to the invention, this object is achieved by having the modulation chamber defined by two axial moveable side walls. One side wall being a flange of a first control piston element of a multi-part piston and the other being a piston step of a second annular piston element which surrounds a portion of the first central piston element. The multi-part piston is located in a bore step with a diameter larger than a diameter of the modulation chamber and the two piston elements each have a piston flange which defines moveable side walls of a pressure control space. High pressure led into the control space forces the central piston element against a bias spring to define a minimum volume of the modulation chamber.

As a result of the two-part design provided for the modulator piston, the piston elements move in opposition to a bias spring in a pressure-reducing phase of the anti-lock control, to force an "acceleration" of the response behavior of the anti-lock control. This "acceleration" is compared with when there is only one piston, the mass of which corresponds to the sum of the masses of the two part pistons. In the pressure modulator according to the invention, the dynamic behavior of the so-called reduced mass two part piston, can be kept clearly lower than the arithmetic sum of their masses and it is this reduced mass that determines acceleration. It is advantageous if the mass distribution between the two piston elements is approximately equal.

This can be obtained by having a piston rod connect a radial flange on a first piston to its piston flange. The piston flange serves as one wall of the control pressure space and the radial flange as one wall of the pressure modulation chamber. This piston rod has an inner portion which is surrounded by the second piston element in a bore of the modulation housing. The bias spring surrounds this inner part and biases the first and second pistons away from each other. The relative diameters of the parts starting at the smallest one is: the piston rod, the inner part, the radial flange, the second piston and the two piston flanges that define the control pressure space.

It is also an advantage if there is a widening opening in the second piston adjacent the piston, which leads, via a passageway in the second piston, to another widening and then to a sump. In this manner a drain for fluid by-passing the piston seals is obtained so that brake fluid and control fluid will not be contaminated.

It is also desirable to have an automatic valve to shut-off the pressure modulator from the brake operator unit when the anti-lock control responds. This can be obtained with a valve ball held in a closed position by a spring and opened by a tappet connected to the second annular piston so as to open shortly after the second piston begins to move. The stroke of the inner piston is desirably at least twice the stroke of the outer piston, so that an early shut-off is obtained by having the outer piston actuate the tappet.

A safety valve is held in closed position by the control pressure of the auxiliary pressure source and opens in response to a drop in pressure to ensure that the brake system remains operational in the event of a failure of the auxiliary pressure source.

Other objects, advantages and novel features of the present invention will become apparent from the following detailed description of the invention when considered in conjunction with the accompanying drawing.

BRIEF DESCRIPTION OF THE DRAWING

The drawing figure is a simplified diagrammatic representation of a front-axle brake circuit of an anti-lock system working with a pressure modulator according to the invention, the pressure modulator being illustrated in section along its central axis in a representation true to scale.

DETAILED DESCRIPTION OF THE DRAWING

The drawing shows an anti-lock system for a road vehicle with a hydraulic dual-circuit brake system. The front-wheel brakes 11 and 12 are combined in a front-axle brake circuit I and the rear-wheel brakes, (not shown for the sake of simplicity) are combined in a rear-axle brake circuit II. The rear-axle brake circuit is represented here merely by its main brake line 13 branching off towards the rear-wheel brakes.

The brake unit has a tandem master cylinder 14 of conventional design, which can be actuated by means of a brake pedal 17 via a brake booster 16, such as for example, a vacuum-type brake booster. The front-axle brake circuit I is connected to a primary outlet-pressure space 18 of the master cylinder 14 and the rear-axle brake circuit II to a secondary outlet-pressure space 19. As a result of the pedal-controlled actuation of the brake unit, static brake pressures are built up and can be fed into the two brake circuits I and II.

For ease in understanding the invention, it will be assumed that the anti-lock system 10 for the rear-axle brake circuit II works on the same principle as explained below for the front-axle brake circuit I, or on another known control principle, such as the feedback principle, according to which, in pressure reduction phases of the anti-lock control, brake fluid is pumped back from the wheel brake(s) subjected to the anti-lock control into the secondary outlet-pressure space 19 of the brake unit 14.

The functional part of the anti-lock system of the front-axle brake circuit I comprises a pressure modulator 21, by means of which brake-pressure reduction, brake-pressure build-up and brake-pressure holding phases on one, or on both of the wheel brakes 11 and/or 12 of the front-axle brake circuit, can be controlled in the course of an anti-lock control cycle taking place.

This pressure modulator of the front-axle brake circuit I is inserted between the main brake line 22 branching off towards the front-wheel brakes 11 and 12 and the pressure outlet 23 of the primary outlet-pressure space 18 of the brake unit 14 which is assigned to this front-axle brake circuit I.

Assigned to each of the wheel brakes 11 and 12 is a brake-pressure regulating valve 24 and 26, respectively, which can be changed over from their illustrated basic open throughflow position 0, in which brake pressure can be built up, or reduced at the particular connected wheel brake 11 or 12, into a blocking position I, in which the respective brake-line branch 22' or 22" of the main brake line 22, branching off to the wheel brakes 11 and 12 at the branch point 27, is shut off from the pressure modulator 21 and thus the brake pressure previously fed into the wheel brake 11 or 12 is maintained at the value then reached.

The brake-pressure regulating valves 24 and 26 are designed as 2/2-way solenoid valves which can be activated in a sequencing combination appropriate for regulation by means of output signals from a electronic control unit 28 of the anti-lock system. This electronic control unit 28 generates control output signals as the result of known processing of out put signals characteristic of the dynamic behavior of the vehicle wheels and coming from wheel-speed sensors (not shown), which are assigned individually to the vehicle wheels and which generate output signals which, in terms of frequency and/or level, are a direct measure of the circumferential speeds of the wheels. As such controllers are well known in the art, the details thereof have not been presented here to simplify the disclosure.

The pressure modulator 21 has an essentially cylindrical pot-shaped housing 29, the housing block of which has a stepped blind bore 31. As seen along the central axis 32 of the pressure-modulator housing 29, there are three bore steps 33, 34 and 36 of differing diameters to define 3 chambers which merge into one another and which via annular housing steps 37, 64 and 38 adjoin one another, or are offset relative to one another.

The bore step 33 of largest diameter is open outwardly (downwards according to the representation of the drawing) and the bore step 36 of smallest diameter is closed off in the axial direction by means of the end wall 39 fixed relative to the housing. This creates a bottom of the modulator housing 29. The diameter of the middle bore step 34, extending between the inner smallest bore step 36 and the outer bore step 33, has approximately 1.5 times the value of the diameter of the smallest bore step 36 and corresponds approximately to three fifths of the diameter (D) of the largest bore step 33.

Two stepped piston elements 41 and 42 are arranged axially displaceably in the intermediate blind bore portion 31 of the modulator housing 29.

One stepped piston element 41, has an inner piston flange 43, by means of which it is guided displaceably in a pressure-tight manner in the smallest bore step 36, and an outer piston flange 44, by means of which it is guided displaceably in a pressure-tight manner within an outer portion of the largest bore step 33 of the stepped bore 31. The annular gaskets 46 and 47 are designed as O-rings fixed to the piston to provide for the respective sealings. The two piston flanges 43 and 44 of the central piston element 41 are connected firmly to one another by means of a piston rod 48.

The second piston element 42 is designed as an annular piston which coaxially surrounds the piston rod 48 of the central piston element 41 and is guided displaceably in a pressure-tight manner by means of its smaller pot-shaped piston step 49 in the middle bore step 34 and by means of its larger flange-shaped piston step 51 in the largest bore step 33 of the modulator housing 29. Annular gaskets 52 and 45, designed as O-rings, provide the respective sealing relative to the housing bores 34 and 33.

The piston rod 43 has three portions, a slender middle portion 54 located between two end portions 56 and 57 of somewhat larger diameter than the slender middle and which adjoin with the two piston flanges 43 and 44. The middle portion 54 of the piston rod is sealed off from its central bore 59 by means of a gasket 58 arranged on the annular piston 42. Central bore 59 is designed as a stepped bore having a portion 61 of large diameter adjacent the pot-shaped piston step 49 of the annular piston 42 and an outer end portion 62 (lower according to the drawing) with a somewhat wider diameter. Within this somewhat wider portion 62 of the central stepped bore 59 of the annular piston 42, there is an O-ring gasket 63 arranged in the piston shaped rod portion 57 of the central piston element 41 to seal the rod portion 57 from the annular piston 42. The inside diameter of the pot-shaped piston step 49 is somewhat less than the diameter of the inner piston flange 43 of the smaller diameter of the central piston element 41. The inner piston flange is axially supportable on the annular end face 64 of the casing of the annular piston 42.

A powerfully pre-stressed helical compression spring 67 is supported on the radial step face 66 at the internal end of annular piston 42 and coaxially surrounds the piston-rod portion 56 and the inner piston flange 43 of the central piston element 41 and thus seeks to force the latter up against the end wall 39 and the annular piston 42 downwards until its lower radial flange 51 comes up against a stop ring 68 in the open end area of housing 29. The stop ring 68 is fixed relative to the housing and is designed as a spring ring inserted into the largest bore step 33 of the housing, between the radial flange 51 of the annular piston and the outer radial flange 44 of the central piston element 42.

These two largest piston flanges 51 and 44 of the two piston elements 42 and 41, form the axially movable limitations of a control-pressure space 69 of the modulator housing 29. This control space 69 is connected through ABS function control valve 71 either to the pressure outlet 72 of an auxiliary-pressure source 73, or to the pressureless tank 74 of this auxiliary-pressure source 73 when the valve is in its basic 0 or excited I positions, respectively.

This auxiliary-pressure source 73, is of conventional design and comprises a pressure accumulator 76 connected to the pressure outlet 72 and charged to a minimum pressure level by means of an accumulator charging pump 77 through an accumulator charging valve 78 under the control of a pressure monitor 79. The maximum outlet pressure of the pressure accumulator, or of the auxiliary-pressure source 73, is limited by a pressure-limiting valve 81. An especially favorable design of the brake system is obtained when the brake unit is provided as a twin master cylinder with an integrated hydraulic brake booster, in which case the auxiliary-pressure source 73 can be used both for brake boosting and for anti-lock control.

When and as long as the control-pressure space 69 of the pressure modulator 21 is subjected to the high outlet pressure of the auxiliary-pressure source 73, the annular piston 42 is thereby forced, by means of its radial flange 51, up against the annular housing step 37 at the upper end of the largest bore step 33, 34 and the central piston element 41 is held with its outer large piston flange 44 downwardly, against an outer stop spring ring 82 inserted into the outer end portion of the largest bore step 33 of the modulator housing 39.

This basic position of the two piston elements 41 and 42 corresponds to the non-activated state of the ABS system. The smaller piston flange 43 of the central piston element 41 is supported on the annular end face 64 of the annular piston 42. In this basic position of the two piston elements 41 and 42, the volume of a modulation chamber 83 is at a minimum. The chamber 83 is annular in this position of the piston element and is connected to the main brake line 22 of the brake circuit I subject to the control 28. In this basic position of the annular piston 42, the valve body 86 of a non-return valve 87, designed as a ball seat valve, is lifted off from its conical valve seat 88 via an axial tappet 84, which can be supported on the annular end face 64 of the annular piston 42. Opening of this non-return valve 87 connects the pressure outlet 23 of the pedal 17 actuated brake unit 14 in communicating connection with the modulation chamber 83 and brake circuit I.

This non-return valve 87, is biased by a pre-stressed valve spring 89, fixed relative to the housing, into the closing position shutting off the pressure outlet 23 of the brake unit 14 from the modulation chamber 83. The non-return valve is designed so that the closing or opening stroke of the valve body 86 corresponds only to a small fraction of the stroke which the piston element 42 can execute relative to the modulator housing 39.

These strokes of the two piston elements 41 and 42 are themselves calculated in such a way that when, as a result of the changeover of the function control valve 71 into its excited position I and the control-pressure space 6 of the pressure modulator 21 is relieved by connection with the tank 74 of the auxiliary-pressure source 73, the two piston elements 41 and 42 are thereby displaced relative to one another as a result of the effect of the helical compression spring 67. The displacement is such that the annular piston 42 moves downward until its larger piston flange 51 abuts against the stop ring 68 and the central piston element 41 is shifted into its "inner" end position, in which it abuts with its inner piston flange 43 against the end wall 39 of the modulator housing, limiting the smallest bore step 36 axially. The volume of the modulation chamber 83 is thus increased to the point that this chamber 83 can receive from the connected brake circuit I, a quantity of brake fluid which is sufficient to obtain a complete decrease of pressure in this brake circuit. Immediately after the start of the stroke of the two piston elements 41 and 42, the non-return valve 87 assumes its closing position, shutting off the modulation chamber 83 from the pressure outlet 23 of the pedal actuated brake unit 14.

As a result of a changeover of the 3/2-way solenoid function control valve 71, if the two brake-pressure regulating valves 24 and 26 remain held in their basic 0 position and "simultaneous" brake-pressure rebuild-up phases of the anti-lock control can be obtained.

As a result of simultaneous or alternative changeovers of the brake-pressure regulating valves 24 and 26, brake-pressure holding phases on one and/or the other wheel brakes 11, 12 of a front-axle brake circuit I can be obtained, while at the same time brake pressure can be reduced or built up again on the other particular wheel brake.

The control signals necessary for controlling regulating valves 24 and/or 26 are generated by the electronic control unit 28, according to known criteria in a sequence and combination appropriate for regulation.

Of course, "opposite-phase" changes of brake pressure, in that the brake pressure is reduced on one wheel brake and at the same time the brake pressure is built up on the other wheel brake, cannot be achieved. However, in an expedient modification of the ABS control, this is possible if a separate pressure modulator 21 is assigned to each of the two wheel brakes 11 and 12. The relevant modification of the electrohydraulic peripheral circuitry being directly within the realm of a person skilled in the art.

The pressure modulator has certain safety features. There is a pressure-controlled safety valve 91, the control-pressure space 92 of which is connected to the pressure outlet 72 of the auxiliary-pressure source 73. This safety valve 91 is thereby maintained in its closing position as long as the auxiliary-pressure source 73 is at its high desired outlet-pressure level. When the outlet pressure of the auxiliary-pressure source 73 falls below this minimum pressure level, the outlet pressure of the auxiliary-pressure source fed into the control-pressure space 69 of the pressure modulator 21 is no longer sufficient to keep the piston elements 41 and 42 in their basic position and consequently the non-return valve 87 in its open position, then the safety valve 91 will open as a result of the effect of its valve spring 93. This provides an open bypass flowpath 94 of the pressure modulator 21, which connects the pressure outlet 23 of the pedal operated brake unit 14 directly to the modulation chamber 83 of the pressure modulator 21 and hence allows for "braking" by the brake unit even when the ABS function is absent.

The piston elements 41 and 43 are equipped with rubber buffers 96 and 97 which dampen impacts of the piston elements with their housing. The annular piston 42, in the region where its radial flange 51 adjoins its smaller piston step 49, is provided on the outside with a indentation 98 which provides an annular space in communicating connection with the outside atmosphere. The central bore 59 of the annular piston 42, in its region surrounding the slender piston-rod portion 54 of the central piston element 41, is provided with a second indentation 99 providing an inner annular space which communicates via a transverse channel 101 with the outer annular space formed by the first indentation. These intercommunicating pressureless-inner spaces provide a pressureless leakage-oil space 102 suitable for media separation between the brake circuit and the control circuit of the pressure modulator 21.

Likewise, the housing space 103 at the upper end of flange 43, adjacent rubber cushion 96, is relieved of pressure outwards by means of a venting channel shown in dotted lines.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A pressure modulator for a vehicle hydraulic brake system having wheel brakes which are connected via a brake circuit to a brake operator means through the pressure modulator and wherein an anti-locking braking control means modifies the operation of the brake operator means by causing the pressure modulator to reduce the brake pressure applied to the wheel brakes in response to an anti-locking signal from the anti-locking brake control means and wherein the pressure modulator comprises: a housing, a moveable modulator piston means, a control pressure space, and an annular modulation chamber;

an auxiliary pressure source means;

a sump means;

a control valve means for alternatively connecting said auxiliary pressure source means and said sump means to said control pressure space;

wherein connection of said auxiliary pressure to said control pressure space by said control valve means causes said modulator piston means to reduce the size of said annular modulation chamber to a minimum volume; and wherein connection to said sump enlarges the size of said annular modulation chamber to a maximum volume;

the modulation chamber being connected to the pressure in the brake circuit coming from the brake operator;

automatic valve means for opening and closing the connection between the annular modulation chamber and the brake operator upon an activation of the anti-lock control means;

wherein when the control-pressure space is connected by the control valve means to the sump means it is relieved of pressure and the modulator piston means is forced by a pre-stressed modulator spring into an end position increasing the size of the modulation chamber to its maximum;

wherein the modulation chamber has two movable sides, as seen in the axial direction, with one moveable side created by a radial flange of a first central piston element of said modulator piston means, and with the other moveable side created by a piston step of a second annular piston element of said modulator piston means, which surrounds an inner portion of the first central piston element co-axially;

a bore step in said modulator housing with a diameter which is larger than a diameter of the annular modulation chamber;

the two piston elements each having a piston flange means guided displaceably in a pressure-tight manner for forming two axially moveable sides of the control-pressure space in said bore step; and wherein;

the connection of the auxiliary-pressure source to the controlled pressure space by the control valve means causes the central piston element to be forced, counter to the pre-stress of the modulator spring means to axially move the first and second piston elements into an end position limited by the second annular piston and in which an axial distance between piston faces of the first and second piston elements delimit the volume of the modulation chamber axially to a minimum.

2. A pressure modulator according to claim 1, wherein the first central piston element and the second annular piston element have approximately the same mass.

3. A pressure modulator according to claim 1, wherein a piston rod connects the radial flange of the first central piston element, to the piston flange of the first central piston element;

said piston flange forming an outer moveable side of the control-pressure space;

said piston rod having the inner portion, which is surrounded by the piston step of the second annular piston, with an axial length approximately equal to an axial extent of an inner portion of the central bore of the annular piston for receiving the modulator spring supported alternately between the first and second piston elements, and with a diameter which is smaller than the inside diameter of the bore portion of the annular-piston bore only by an amount which ensures a radial width sufficient for receiving the modulator spring means.

4. A pressure modulator according to claim 3, wherein the inner portion of the piston rod is connected, by means of a piston rod middle portion of smaller diameter than said inner portion, to a piston-shaped piston rod portion which is of larger diameter than said middle portion and which is guided displaceably in a pressure-tight manner in the outer end portion of the central bore of the annular piston.

5. A pressure modulator according to claim 4, wherein the central bore of the second annular piston is sealed off from the middle portion of smallest diameter of the piston rod by an annular gasket fixed to the second annular piston; and wherein there is a widening in the middle portion defining an inner annular space connected via a transverse channel in the annular piston to an outer annular space on an outer surface of the annular piston which surrounds the inner annular space coaxially and which itself communicates with a venting channel of the modulator housing.

6. A pressure modulator according to claim 1, wherein the automatic valve means causing the modulation chamber to be shut off from the brake unit when the anti-lock control is activated, comprises a ball valve, in which a valve ball, is held open by lifting it from a valve seat by means of a tappet supportable on the annular end face of the annular piston when the annular piston is in the position corresponding to a minimum volume of the modulation chamber; and wherein the axial closing distance of the ball valve from the valve seat corresponds to a small fraction of 1/20 to 1/10 of the stroke for changing the volume of the modulation chamber axially on one side by the second annular piston.

7. A pressure modulator according to claim 6, wherein the stroke for changing the volume of the annular piston is between 2 and 6 mm, and the stroke of the relative movements which the central piston element can execute relative to the annular piston is at least equal to double the value of the stroke for changing the volume of the annular piston.

8. A pressure modulator according to claim 1, wherein there is a pressure-controlled safety valve means which is held at a blocking position by means of a sufficiently high outlet pressure of the auxiliary-pressure source and which, in response to a decrease of the outlet pressure of the auxiliary-pressure source, assumes an open position in which an outlet of the brake operator means is connected at least to one of the modulation chamber of the pressure modulator and a main brake line of the brake circuit.

9. A pressure modulator according to claim 6, wherein there is a pressure-controlled safety valve means which is held at a blocking position by means of a sufficiently high outlet pressure of the auxiliary-pressure source and which, in response to a decrease of the outlet pressure of the auxiliary-pressure source, assumes an open position in which an outlet of the brake operator means is connected at least to one of the modulation chamber of the pressure modulator and a main brake line of the brake circuit.

* * * * *